(12) United States Patent
Davie

(10) Patent No.: US 6,320,845 B1
(45) Date of Patent: *Nov. 20, 2001

(54) TRAFFIC MANAGEMENT AND FLOW PRIORITIZATION ON A ROUTED COMPUTER NETWORK

(75) Inventor: Bruce Davie, Belmont, MA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,024

(22) Filed: Apr. 27, 1998

(51) Int. Cl.[7] .............................. G06F 11/00; H04L 12/56
(52) U.S. Cl. ...................... 370/230; 370/235; 370/392; 370/412; 370/428
(58) Field of Search ................... 370/230, 231, 370/232, 233, 235, 252, 253, 392, 395, 396, 397, 401, 409, 412, 428, 429

(56) References Cited

U.S. PATENT DOCUMENTS

| | | | |
|---|---|---|---|
| 5,406,557 | * | 4/1995 | Baudoin . |
| 5,487,061 | * | 1/1996 | Bray ..................................... 370/252 |
| 5,748,614 | * | 5/1998 | Wallmeier ............................. 370/235 |
| 5,831,971 | * | 11/1998 | Bonomi et al. ....................... 370/230 |
| 5,978,356 | * | 11/1999 | Elwalid et al. ....................... 370/230 |
| 6,038,217 | * | 3/2000 | Lyles .................................... 370/233 |

OTHER PUBLICATIONS

L. L. Peterson et al., "Computer Networks: a sysem approach", *Morgan Kaufmann Publishiers, Inc.*, 1996, pp. 402–406.

* cited by examiner

Primary Examiner—Alpus H. Hsu
Assistant Examiner—Afsar M. Qureshi
(74) Attorney, Agent, or Firm—Cesari and McKenna, LLP

(57) ABSTRACT

Traffic shaping is combined with per-flow fairness in routing devices operating on virtual circuit (VC) networks. In the case of a backlogged VC, flows are temporarily suppressed notwithstanding their transmission priority. This suppression, however, is implemented in a manner that respects the priority level associated with the VC. In other words, although traffic is limited to backlogged VCs in order to allow those lines to clear, this limitation occurs in a manner consistent with weighting or other per-flow fairness criteria.

26 Claims, 4 Drawing Sheets

TRAFFIC MANAGEMENT AND FLOW PRIORITIZATION ON A ROUTED COMPUTER NETWORK

FIELD OF THE INVENTION

The present invention relates to computer networks and, more particularly, to traffic management and flow prioritization across communication circuits (especially virtual circuits).

BACKGROUND OF THE INVENTION

Data communication in a computer network involves the exchange of data between two or more entities interconnected by communication links and subnetworks. These entities are typically software programs executing on hardware computer platforms, which, depending on their roles within the network, may serve as end stations or intermediate stations. Examples of intermediate stations include routers, bridges and switches that interconnect communication links and subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "broadcast" networks: when a source station transmits a frame over the LAN, it reaches all stations on that LAN. If the intended recipient of the frame is connected to another network, the frame is passed over a routing device to that other network. Collectively, these hardware and software components comprise a communications network and their interconnections are defined by an underlying architecture.

Traffic flowing through a network may be considered as a set of flows. A flow consists of a set of packets that require similar treatment by the network. Flows may be defined according to a wide range of criteria to meet different needs. For example, a flow could be the set of packets sent from one host to another, or it could be the set of packets exchanged by a pair of communicating application programs. In general there may be many flows passing through any point in the network at any time.

Packets travel between network entities over "circuits" connecting the entities. The traditional circuit is a physical transmission line between the communicating stations, and over which data is exchanged. The circuit is defined by a communication subnetwork that carries messages between connected entities the way the telephone system connects callers—i.e., over wires or optical fibers intercommunicating through switches. Accordingly, the physical circuit is continuously dedicated to the transmission path between connected entities; data exchange is synchronous over the path in the sense of being tied to a common master clock.

This mode of communication absorbs substantial bandwidth. Unless data moves constantly between the communicating entities, the circuit will at times be idle and the bandwidth consequently wasted. To avoid this, networks frequently employ "virtual" circuits rather than dedicated transmission lines. The virtual circuit establishes a routing pathway for message travel between communicating stations, and is virtual in the sense that many stations can transmit across the lines defining the circuit; these are not dedicated to a single pair of entities. Different types of networks employ the virtual circuit (VC) model of communication, most notably Frame Relay and Asynchronous Transfer Mode (ATM).

ATM can accommodate constant-rate and variable-rate data traffic. The VC may be established by a SETUP message, which travels through a sequence of switches until it reaches the destination station, thereby establishing the VC path. In general, a VC may carry many flows at one time.

A representative ATM configuration is shown in FIG. 1. A single VC interconnects router 25 and router 27. An end station 10 on a LAN 12 communicates with an end station 15 on another LAN 17 over this VC, and with an end station 20 on still another LAN 22 over the same VC. The VC in this case carries two flows: one from end station 10 to end station 15, and one from end station 10 to end station 20. The flows are handled by first and second routers 25, 27 and a series of ATM switches representatively indicated at 30, 32. Each router 25, 27 is connected to an illustrated LAN and to an ATM switch. The connection to an ATM switch is by means of an ATM interface configured to direct flows onto VCs; the routers establish further connections by means of additional interfaces, which may or may not be ATM interfaces. That is, each router 25, 27 may contain various interfaces for handling different types of network traffic.

Routers 25, 27 typically forward IP datagrams (i.e., operating at level 3 in the protocol stack by inspecting IP headers), terminating VCs at the ATM interfaces. ATM switches 30, 32 forward ATM cells (operating at level 2 in the protocol stack by examining ATM cell headers). VCs do not terminate on the interfaces of ATM switches 30, 32, instead passing through the switches. The VCs, then, span routers 25, 27, originating on one router and terminating on the other.

There may be more than one VC between router 25 and router 27. Furthermore, there may be additional VCs originating (or terminating) on routers 25, 27 and terminating (or originating) on other routers not shown here.

The foregoing discussion assumes a continuous sequence of ATM switches intervening between ATM-capable routers 25, 27. Other device sequences are of course possible. For example, depending on the routing algorithm and communications costs, router 25 may direct traffic directly to router 27 and vice versa. Alternatively, one or more routers may intervene between ATM switches 30, 32. In this case, communication between end stations 10, 15 and 10, 20 would occur over paths defined by multiple sequential VCs, each terminating at a router.

Permitting communication resources to be shared among many communicating entities may lead to congestion. Routers and links have finite information-handling capacity (bandwidth), and if streams of packets arrive on several input lines all requesting the same output line, a queue will build up. Eventually, if the queue exceeds the buffering capacity of the router, packets will be lost.

One approach to congestion control is "traffic shaping," which regulates the average rate and concentration of data transfer—that is, the traffic pattern. Limitations on transmission patterns are imposed on each VC with the goal of avoiding excessive data backup. These limitations are enforced by a "shaper," usually implemented in hardware running on a router's ATM network interfaces. The pattern adopted by a shaper may differ for different VCs and may also vary over time for a particular VC. If packets arrive at the router above the allowed VC transmission rate, then the network interface "shapes" the traffic sent on the VC to conform to that rate. As a result, packets must be buffered in the router circuitry or on the network interface itself. When this condition occurs, the VC is said to be "backlogged."

Another approach to traffic management is reactive rather than proactive. The bandwidth of the VC cannot be expanded, but at least it can be allocated among flows on the VC. "Fair queueing" is a simple approach to bandwidth allocation in which a queue is defined for each flow seeking access to a given router output line. The router is programmed to scan the queues round robin, sequentially taking the first packet from each queue and transmitting it over the line. A flow, in this circumstance, is a series of packets requiring similar queueing treatment.

One problem with this approach is that it allocates more bandwidth to hosts that transmit large packets. Accordingly, fair queueing is typically implemented on a byte-by-byte, rather than on a packet-by-packet basis. A second problem is that all flows receive the same amount of bandwidth. In many situations, certain flows—such as those carrying critically important data—deserve greater bandwidth than others. A modified approach to fair queueing, called "weighted fair queueing" (WFQ), discriminates among flows by causing the network interface to transmit more bytes from certain queues during each pass, or to return to those queues more often than others.

Shaping and queueing represent different and in some ways complementary approaches to traffic management. Shaping limits traffic in an effort to avoid congestion, but does not attempt to ensure fairness in bandwidth allocation. WFQ criteria, by contrast, operate based on the specified characteristics of the flows rather than congestion on the VCs they use. For example, a packet due for transmission based on WFQ criteria may belong to a backlogged VC, and so cannot or should not be sent.

SUMMARY OF THE INVENTION

The present invention combines traffic shaping with per-flow fairness in intermediate stations operating on networks that support virtual circuits. In the case of a backlogged VC, the invention ensures that flows from the backlogged VC are temporarily suppressed notwithstanding their queue position. This suppression, however, is implemented in a manner that respects the queueing criteria. In other words, although traffic to backlogged VCs is limited in order to allow those lines to clear, this limitation occurs in a manner consistent with weighting or other per-flow fairness criteria. At the same time, packets destined for VCs which are not backlogged may still be sent.

In a first aspect, the invention comprises a router that receives packet flows from the network and transmits these packets onto another portion of the network. The router is equipped with two modules, which may be implemented as sequences of executable instructions or as hardware devices. The first module manages packet traffic by (i) defining output parameters, such as a traffic-shaping profile, that govern transmission of packets (or, more typically, flows of packets) over the network; and (ii) monitoring the transmission of packets over each output port for conformance to the transmission parameters. The traffic-management module may be a shaper, in which case the parameters define a traffic pattern that governs flow transmission. In an ATM environment, packet flows are associated with VCs, and the traffic pattern imposed by the shaper on a particular flow depends on the characteristics of the VC over which it travels. It should be emphasized that, in this environment, the shaping parameters vary with the VC and not with the physical port over which traffic for a particular VC is routed. At the same time, the invention can also be applied to routing devices having multiple output ports, with prioritization being used to allocate transmission resources among the physical ports themselves rather than among VCs.

The second module implements prioritization among packets by a queueing scheme, preferably (but not necessarily) WFQ, by (i) queueing received packets for transmission, and (ii) selecting packets for transmission based on a selection criterion. The prioritization module is responsive to the traffic-management module, postponing transmission of selected packets whose transmission would violate the transmission parameters (e.g., shaping requirements). In a WFQ implementation, the postponement duration is proportional to the weight associated with a particular packet (or flow).

The interaction between the first and second modules may be orchestrated such that the prioritization module, upon selecting a packet for transmission, interrogates the traffic-management module for indication of a shaping violation. The traffic-management module provides that indication if transmission of the selected packet would violate the transmission parameters associated with the packet. This mode of interaction facilitates scalability in the presence of many VCs; it is not necessary, for example, for a queueing component to assume a "per-VC" state (which would require a separate instance of the queueing component for each VC), since the queueing component can interrogate the traffic-management module (which naturally maintains separate per-VC states).

In a second aspect, the invention implements hysteresis by, for example, causing the traffic-management module to continue reporting a violation condition for a certain time period after the management criteria would permit transmission of the packet. It may then be able to accept more than one packet when it ceases reporting the violation condition. This can improve the overall fairness of prioritization by admitting packets from several flows. In this case the traffic-management module should be able to buffer a number of packets awaiting transmission.

In a third aspect, the invention is implemented on a network interface. An interface directs the input and output transactions of a router, typically receiving packet flows from a circuit and transferring these to the router's input line, and transmitting, to a circuit, packet flows from the router output line. In accordance with the invention, the interface contains and implements the traffic-shaping and prioritization modules discussed above in connection with the output line for which it is responsible.

In a fourth aspect, the invention comprises methods implementing the foregoing operations.

BRIEF DESCRIPTION OF THE DRAWINGS

The invention description below refers to the accompanying drawings, of which.

DETAILED DESCRIPTION OF THE PREFERRED EMBODIMENTS

Figure 1:
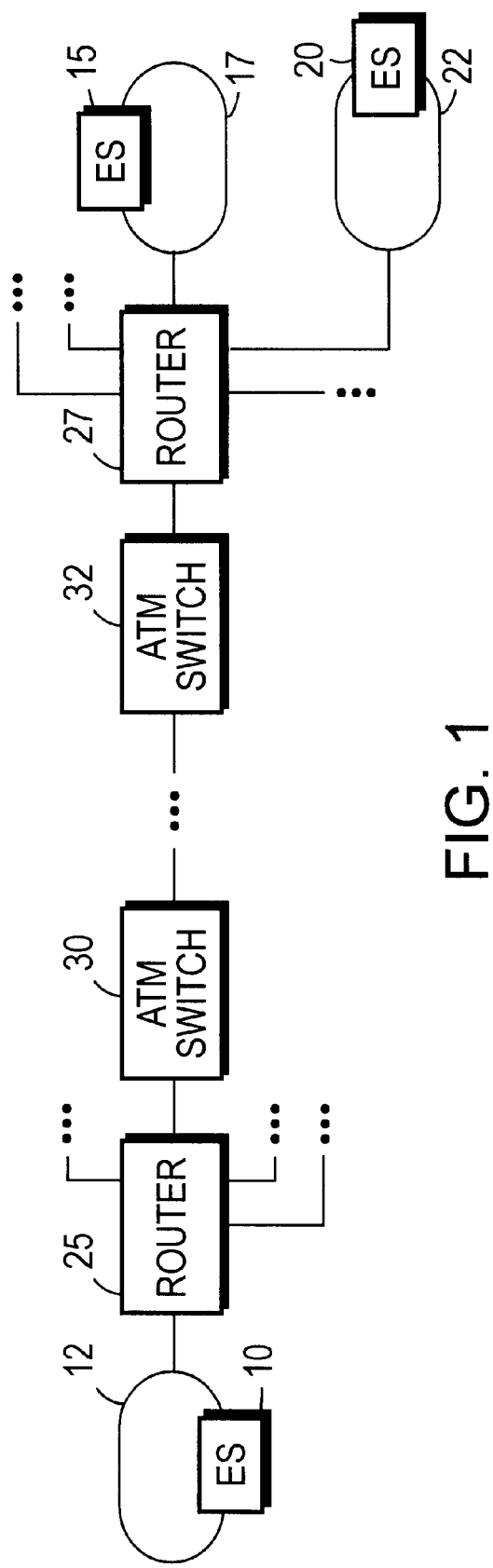
FIG. 1 is a schematic block diagram of a representative ATM configuration.
Figure 2:
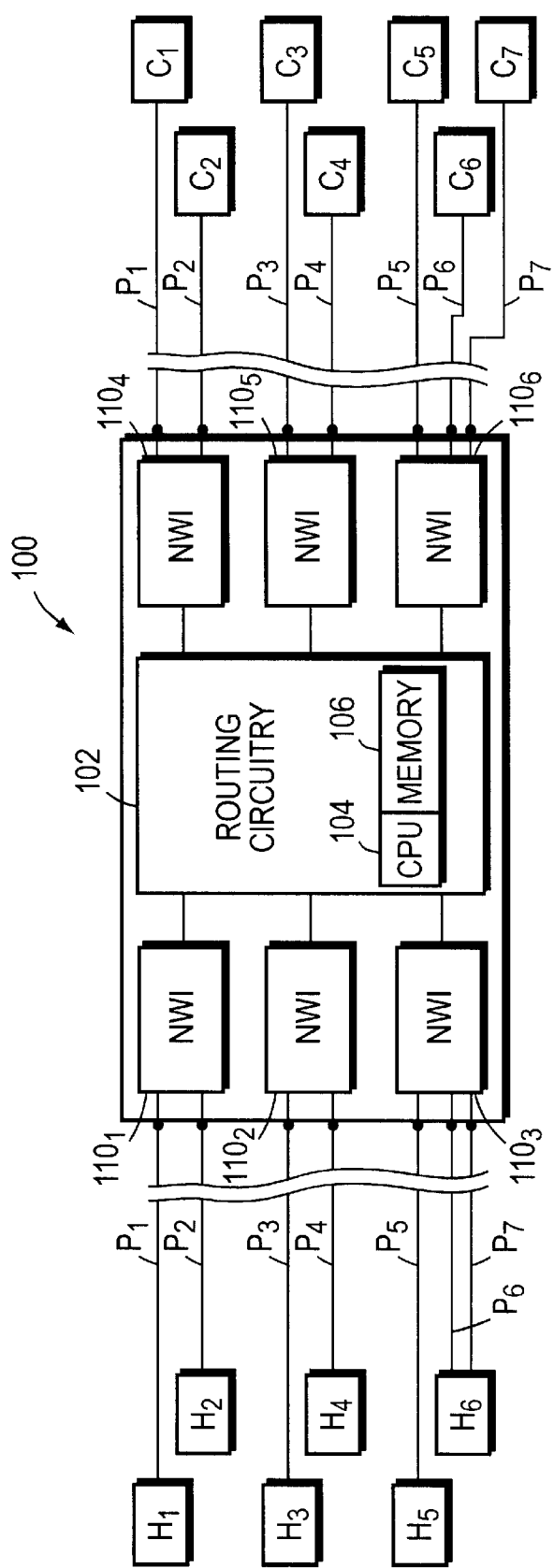
FIG. 2 is a schematic block diagram of a routing device implementing the present invention.

With reference to FIG. 2, a series of servers or hosts $H_1 \ldots H_6$ are connected to a series of client computers $C_1 \ldots C_7$ over a corresponding number of data paths $P_1 \ldots P_7$. Although ATM communication is by no means limited to client-server interactions, these are useful for illustrative purposes, indicating, for example, how a single host $H_6$ can simultaneously maintain multiple paths $P_6$, $P_7$ in order to communicate with two different client computers $C_6$, $C_7$. Typically, the paths $P_1 \ldots P_7$ will traverse multiple routers, and therefore comprise multiple VCs. For simplicity of presentation, however, a single router is shown at 100 (it being understood that flows entering router 100 from one of the hosts H may have already passed through one or more ATM switches and/or routers, while flows exiting router 100 may travel through one or more ATM switches and/or routers before reaching clients C).

The router 100 includes conventional routing circuitry 102, which itself includes a central processing unit (CPU) 104 and computer memory 106. Router 100 also includes a series of ATM network interfaces $110_1 \ldots 110_6$, each associated with a separate router port, and each capable of handling multiple simultaneous virtual circuits. Ordinarily, the invention is implemented within the network interfaces 110.

Figure 3:
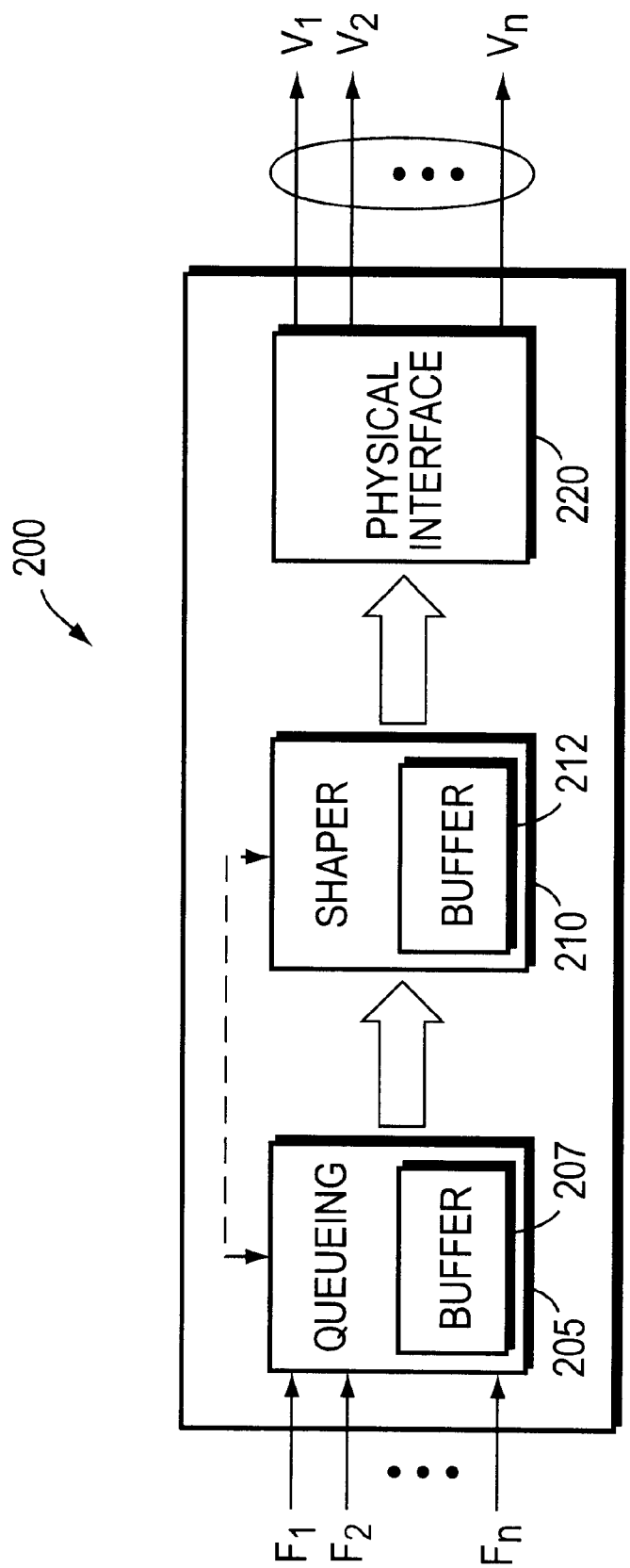
FIG. 3 is a schematic block diagram of a network interface implementing a representative embodiment of the invention.

The components of a representative network interface, configured for output in accordance with the present invention, are shown in FIG. 3. The interface 200 receives a series of flows $F_1 \ldots F_n$ from the routing circuitry 102 (see FIG. 2), which directs incoming flows to the proper network interfaces for transmission on their associated output ports. The flows are received by a queueing module 205, which implements prioritization among packets arriving on the various flows $F_1 \ldots F_n$. Module 205 controls a memory buffer 207 in which packets are temporarily stored prior to their release.

A shaper module 210 receives prioritized packets from queueing module 205, and may also control a memory buffer 212. Shaper 210 manages packet traffic in accordance with output parameters, which are generally specified by the VC with which packets are associated. The shaper passes packets to a physical layer interface 220, which connects the router 200 to the next computer network in the path served by the output port, only when two conditions hold: (i) it has received a packet from queueing module 205 for a particular VC which it has not yet sent, and (ii) it can send the packet without violating the shaping parameters of the VC.

When shaper 210 is unable to send a packet it has received from queueing module 205, because transmission of the packet would violate the shaping parameters of the associated VC, it may place it in buffer 212. This buffer is generally organized into logically separate partitions corresponding to the active VCs. These partitions, of course, are of limited capacity, and shaper 210 is therefore configured to exert "backpressure" when it can no longer accept any more packets for a given VC. Backpressure takes the form of a notification signal to queueing module 205, and is implemented on a per-VC basis; that is, a signal informing queueing module 205 that shaper 210 cannot presently accept additional packets associated with a particular VC has no effect on acceptance of packets associated with other VCs. The notification signal can itself be transmitted from shaper 210 to queueing module 205, or can instead represent a condition reported to or sensed by queueing module 205 upon interrogation.

Shaper 210 does not exert backpressure on a VC unless it already has some data for that VC awaiting transmission. Thus, queueing module 205 can submit a packet to shaper 210 whenever the VC with which the packet is associated is not backlogged—i.e., so long as queueing module 205 has not received a backpressure signal from shaper 210. For its part, shaper 210 is not concerned with the organization of packets as flows; these are managed by queueing module 205.

Figure 4:
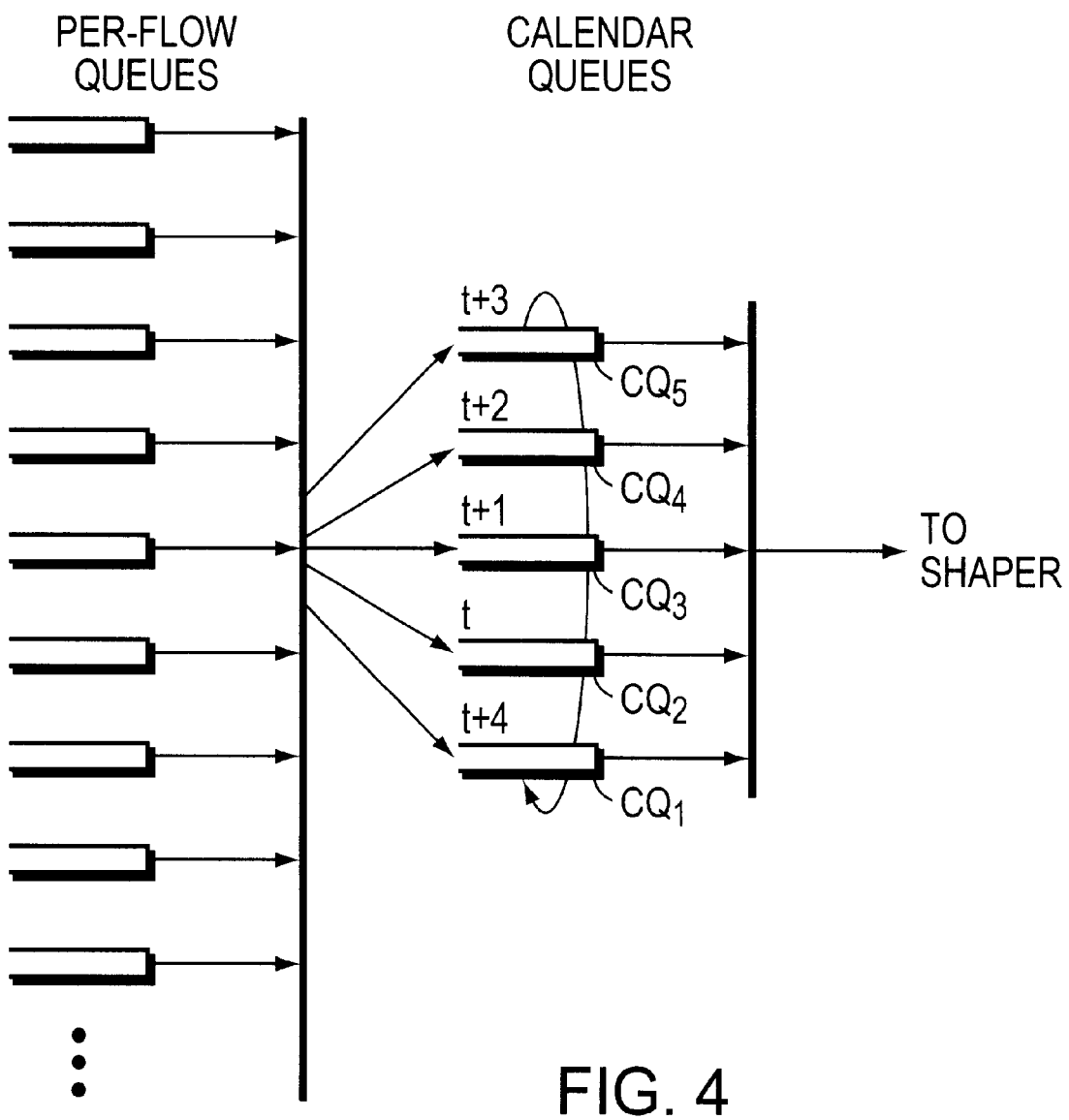
FIG. 4 schematically illustrates operation of a representative WFQ element utilizing calendar queueing.

The operation of a preferred queueing module 205 is illustrated in FIG. 4. Module 205 maintains, in buffer 207, two sets of queues: a set of "per-flow" queues each associated with a particular flow; and a set of calendar queues representatively indicated at $CQ_1 \ldots CQ_5$. The number of per-flow queues depends on the number of flows being handled by the router at a particular time. The number of calendar queues, on the other hand, is a fixed feature of the queueing module. Packets are transferred from the per-flow queue on which they arrived to a calendar queue in accordance with a prioritization scheme, as discussed below. The calendar queues are logically organized as a ring, each queue being associated with a rolling time slot. As shown in the figure, $CQ_2$ is due to be served—that is, one of its packets transferred to shaper 210—at the present time t. $CQ_3$, which is said to be one time slot away from $CQ_2$, is due to be served at a future time t+1 (where the numeral 1 indicates a predetermined time increment); $CQ_4$, two time slots away from $CQ_2$, is due to be served at time t+2; $CQ_5$ at time t+3; and $CQ_1$ at time t+4. Thus, at the future time $t_{new}$=t+1, it is $CQ_3$ that is presently served, while $CQ_2$ is not scheduled to be served again until $t_{new}$+4; the time remaining before the other calendar queues are served has advanced by an increment of 1.

The manner in which packets from the per-flow queues are assigned to a calendar queue depends on the prioritization scheme implemented by the queueing module. The higher the priority associated with the packet, the sooner it should be sent, and therefore the more temporally proximate the calendar queue onto which it should be loaded. Preferably, queueing module 205 implements WFQ, and each per-flow queue is associated with a weight W (with lower weights associated with higher priority levels, i.e., greater shares of the VC). Only one packet from a given flow can be on any of the calendar queues at any given time.

If a packet from flow $F_x$ arrives at queueing module 205 when there are no other packets from flow $F_x$ in the system (i.e., neither in the per-flow queues nor in the calendar queues), a per-flow queue for flow $F_x$ is established (if it has not been already), and the packet is placed on the calendar queue that is W time slots away from the calendar queue currently being served (where W is the weight associated with flow $F_x$). That is, the packet is scheduled for transmission W time slots in the future, so that packets associated with low values of W are transmitted sooner than those with high values of W.

If, on the other hand, a packet from flow $F_x$ arrives at queueing module 205 when packets from flow $F_x$ are already in the system, the packet is simply placed on the per-flow queue already associated with flow $F_x$. Whenever a packet from flow $F_x$ is served from a calendar queue, the per-flow queue for flow $F_x$ is examined and, if it is not empty, the first packet in the queue is transferred to the calendar queue that is W time slots away from the calendar queue from which the flow $F_x$ packet was just served. In this way, packets from flow $F_x$ are consistently scheduled for transmission (to shaper 210) W time slots in the future.

This scheme breaks down under backlogged conditions—that is, when queueing module 205 selects for transmission a packet satisfying the WFQ criteria, but which belongs to a VC that is backlogged. Under these circumstances, the present invention ensures that only packets belonging to non-backlogged VCs are transferred to shaper 210, and that each flow utilizing a backlogged VC shares the capacity of that VC fairly (e.g., according to its weight) with other flows using the VC. Thus, applied to a single physical-layer interface as shown in FIG. 3, the benefits of the invention are realized most fully in the context of a plurality of simultaneously active VCs, since interaction with shaper 210 allows the single queueing module 205 to handle multiple VCs.

In a preferred embodiment of the present invention, queueing module 205, upon selecting a packet from a calendar queue for transmission, interrogates shaper 210 to determine whether it belongs to a backlogged VC. If not, the packet is passed to shaper 210 in the normal fashion. If the VC is backlogged, the packet is placed on a different calendar queue scheduled in the future—preferably on the queue that is W time slots ahead of the current queue from which the packet is removed. In this way transmission of the packet is deferred for a period of time, following which the VC may no longer be backlogged. Moreover, because the period of deferral is determined by W, per-flow fairness among flows sharing a backlogged VC is ensured. That is, if several flows of different weights share a backlogged VC, those with the lowest weights are accorded the best chance to send a packet when the VC becomes non-backlogged, since their transmission opportunities recur most frequently. If a backlogged VC is considered as a random process that will, at some unknown time in the future, become sufficiently non-backlogged to accept one packet, then a flow of weight W has twice as much chance as a flow of weight 2 W to get its first deferred packet accepted for transmission at that time.

Various modifications to this approach are possible. In one such variation, shaper 210 implements hysteresis by treating a VC as backlogged for some period of time after buffer space for that VC becomes available again in buffer 212. Shaper 210 might, for example, continue to report a backlogged condition until the VC has room to accept several packets without becoming backlogged again. In this way, queueing module 205 is able to deliver several packets to shaper 210 when backlogging subsides, thus possibly enabling packets from several flows to be delivered, which can improve overall prioritization fairness.

The overhead associated with checking if a packet selected for transmission belongs to a backlogged VC, and rescheduling its transmission if it does, can be reduced by scaling up the weights for flows experiencing backlog. This approach is particularly useful where the average backlog duration substantially exceeds the interval between time slots. Per-flow fairness will be maintained so long as the weights are scaled proportionately for the various flows sharing each backlogged VC. For example, if flow $F_x$ has a weight of 2 and flow $F_y$ has a weight of 6, these could be increased to 20 and 60, respectively, without affecting fairness. Different scale factors may be used on different VCs. It is important, of course, to return the weights to their original levels when the VC is no longer backlogged.

The degree of sophistication with which this scheme is implemented depends in part on the information passed by shaper 210 to queueing module 205 in the course of interrogation. At a minimum, it is preferable to pass two bits per VC: one indicating that the shaper can accept packets for the VC, and one indicating whether the shaper still has packets awaiting transmission on the VC (but not so many that it cannot accept more). The second bit enables weights to be scaled during backlogging as described above. By passing further information, such as the degree of backlog and/or its current or average duration, shaper 205 enables queueing module to more finely determine an optimum scaling factor.

The invention may be applied to multiple physical-layer interfaces rather than multiple VCs of a single interface. In accordance with this approach, each active physical-layer interface 220 has an inherent transmission rate determined by the interface circuitry (as compared with VCs, which are generally shaped to a rate less than the maximum transmission rate of the associated physical-layer interface). Queueing module 205 is responsive to the transmission rates of the individual interfaces (rather than the per-VC requirements of the shaper), allocating transmission resources among interfaces (rather than among VCs). In this way, a single queueing module can manage flows of incoming packets destined for transmission over different physical-layer interfaces that may not have shapers associated therewith.

It will therefore be seen that the foregoing represents a highly scalable, straightforwardly implemented approach to management of flows across VCs prone to backlogging. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, both the traffic-management or prioritization modules may be implemented either as executable computer instructions or as hardware (e.g., as an ASIC).

What is claimed is:

1. A routing device configured for management of packet flows, the device comprising:
   a. at least one input port for receiving flows;
   b. at least one output port for transmitting flows on at least two virtual circuits;
   c. traffic-management means for (i) defining parameters governing transmission of packets over the virtual circuits and (ii) monitoring transmission of packets over the virtual circuits for conformance to the transmission parameters;
   d. prioritization means for (i) queueing packets arriving over an input port for transmission over an output port and (ii) selecting queued packets for transmission based on a selection criterion, the prioritization means interacting with the traffic-management means and postponing, for a selected time, transmission of selected packets where such transmission would violate the transmission parameters; and
   e. the selected time is selected in response to the priority level associated with the packet.

2. The apparatus of claim 1 wherein the traffic-management means is a shaper.

3. The apparatus of claim 2 wherein the transmission parameters vary among the virtual circuits.

4. The apparatus of claim 1 wherein the selection criterion is determined by a weighted fair queueing scheme, the prioritization means associating different packets with different priority levels and selecting packets for transmission in accordance with the priority levels.

5. The apparatus of claim 4 wherein the priority level associated with a flow is determined by the virtual circuit with which the flow is associated.

6. The apparatus of claim 4 wherein the prioritization means postpones selection of a packet by an amount of time proportional to the priority level associated with the packet.

7. The apparatus of claim 1 wherein the routing device has a plurality of output ports and different packets are directed to different ones of the output ports, the transmission parameters governing access to the output ports.

8. The apparatus of claim 1 wherein the prioritization means, upon selecting a packet for transmission, interrogates the traffic-management means for a violation signal, the traffic-management means providing the violation signal if transmission of the selected packet would violate the parameters associated with the packet.

9. The apparatus of claim 8 wherein the traffic-management means implements transmission hysteresis by maintaining the violation signal for a time period after transmission of the selected packet would no longer violate the parameters associated with the packet.

10. A routing device configured for management of packet flows, the device comprising:
   a. at least one input port for receiving flows;
   b. at least two output ports for transmitting flows, each port having a maximum rate of packet transmission, the maximum rates varying among the at least two output ports; and
   c. prioritization means for (i) queueing packets arriving over an input port for transmission over a designated output port and (ii) selecting queued packets for transmission based on a selection criterion, the selection criterion being determined by a weighted fair queueing scheme, the prioritization means associating different packets with different priority levels and selecting packets for transmission in accordance with the priority levels, the prioritization means interacting with the ports and postponing transmission of selected packets where such transmission would exceed the maximum rate of the designated output port, the prioritization means postponing selection of a packet by an amount of time proportional to the priority level associated with the packet.

11. A routing device configured for management of packet flows, the device comprising:
   a. at least one input port for receiving flows;
   b. at least two output ports for transmitting flows, each port having a maximum rate of packet transmission; and
   c. prioritization means for (i) queueing packets arriving over an input port for transmission over a designated output port and (ii) selecting queued packets for transmission based on a selection criterion, the prioritization means interacting with the ports and postponing transmission of selected packets where such transmission would exceed the maximum rate of the designated output port, the prioritization means, upon selecting a packet for transmission, interrogating the port for a violation signal, the port providing the violation signal if transmission of the selected packet would exceed the maximum transmission rate associated with the port.

12. The apparatus of claim 11 wherein the port implements transmission hysteresis by maintaining the violation signal for a time period after transmission of the selected packet would no longer exceed the maximum transmission rate.

13. A network interface for use with a router having at least one output line, the network interface comprising:
   a. means for transmitting to a plurality of virtual circuits, over an output line, packet flows received from the router;
   b. traffic-management means for (i) defining parameters governing transmission of packets and (ii) monitoring transmission of packets for conformance to the transmission parameters;
   c. prioritization means for (i) queueing packets for transmission and (ii) selecting queued packets for transmission based on a selection criterion, the prioritization means interacting with the traffic-management means and postponing, for a selected time, transmission of selected packets where such transmission would violate the transmission parameters; and
   d. the selected time is selected in response to the priority level associated with the packet.

14. The network interface of claim 13 further comprising buffer storage for retaining the queued packets.

15. The network interface of claim 13 wherein the traffic-management means is a shaper.

16. The network interface of claim 13 wherein the transmission parameters varying among the virtual circuits.

17. The network interface of claim 13 wherein the selection criterion is determined by a weighted fair queueing scheme, the prioritization means associating different packets with different priority levels and selecting packets for transmission in accordance with the priority levels.

18. The network interface of claim 17 wherein the priority level associated with a flow is determined by the virtual circuit with which the flow is associated.

19. The network interface of claim 18 wherein the prioritization means postpones selection of a packet by an amount of time proportional to the priority level associated with the packet.

20. The network interface of claim 13 wherein the prioritization means, upon selecting a packet for transmission, interrogates the traffic-management means for a violation signal, the traffic-management means providing the violation signal if transmission of the selected packet would violate the parameters associated with the packet.

21. The network interface of of claim 20 wherein the traffic-management means implements transmission hysteresis by maintaining the violation signal for a time period after transmission of the selected packet would no longer violate the parameters associated with the packet.

22. A method of managing packet flows in a computer network, the method comprising the steps of:
   a. receiving packet flows from a portion of the computer network for transmission to another portion of the computer network over a plurality of virtual circuits;
   b. defining parameters governing transmission of packets;
   c. monitoring transmission of packets for conformance to the transmission parameters;
   d. queueing packets for transmission;
   e. selecting queued packets for transmission based on a selection criterion but postponing, for a selected time, transmission of selected packets where such transmission would violate the transmission parameters; and
   f. the selected time is selected in response to the priority level associated with the packet.

23. The method of claim 22 wherein the transmission parameters vary among the virtual circuits.

24. The method of claim 22 wherein the packets have associated priority levels, selection of a packet being postponed by an amount of time proportional to the priority level associated with the packet.

25. The method of claim 22 wherein transmission is postponed for a time period after transmission of the selected packet would no longer violate the parameters associated with the packet, thereby implementing hysteresis.

26. The method of claim 22 wherein the virtual circuits are each associated with one of a plurality of output ports, the transmission parameters governing access to the output ports based on maximum transmission rates.

* * * * *